United States Patent [19]

Daniel et al.

[11] 4,217,260

[45] Aug. 12, 1980

[54] LATICES OF VINYL POLYMERS WHICH ARE STABLE IN ELECTROLYTES

[75] Inventors: Jean-Claude Daniel, Fontenay-sous-Bois; Nadine Jorio, Blaye, both of France

[73] Assignee: Rhone-Poulenc Industries, Paris, France

[21] Appl. No.: 927,464

[22] Filed: Jul. 24, 1978

[30] Foreign Application Priority Data

Aug. 3, 1977 [FR] France ................................ 77 23879

[51] Int. Cl.$^2$ ............................................. C08L 25/04
[52] U.S. Cl. ....................... 260/29.6 H; 260/29.6 SQ; 525/72; 525/78
[58] Field of Search ................... 260/29.6 SQ, 29.6 H, 260/879; 425/407; 525/72, 78

[56] References Cited

U.S. PATENT DOCUMENTS

| | | | |
|---|---|---|---|
| 3,579,613 | 5/1971 | Schaper et al. | 260/29.6 SQ |
| 4,012,560 | 3/1977 | Baatz et al. | 260/29.6 SQ |
| 4,051,090 | 9/1977 | Horowitz et al. | 260/879 |
| 4,051,093 | 9/1977 | Wendel et al. | 260/29.6 H |

FOREIGN PATENT DOCUMENTS 1233582 10/1906 France .

*Primary Examiner*—Hosea E. Taylor
*Assistant Examiner*—Amelia B. Yarbrough
*Attorney, Agent, or Firm*—McDougall, Hersh & Scott

[57] ABSTRACT

The invention concerns latices of vinyl polymers which are stable in electrolytes. They comprise a dispersion of particles of an average diameter from 0.03 to 5 μm. They are made up of a core of vinyl and/or diene polymer carrying carboxylic and/or sulphonate groups and a peripheral layer of vinyl polymer with

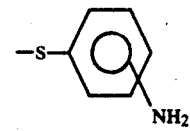

groups at the ends.

Applications of the latices in reproduction, in the textile, paint and varnish industries in the glue and paper industries and also for fixing proteins and in the manufacture of reagents for diagnosis.

13 Claims, No Drawings

LATICES OF VINYL POLYMERS WHICH ARE STABLE IN ELECTROLYTES

The invention concerns latices of vinyl polymers containing carboxylic and/or sulphonate groups and with

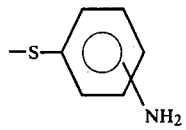

groups at the ends, the latices being stable in electrolytes. It also relates to a method of preparing such latices.

Latices of styrene polymers with

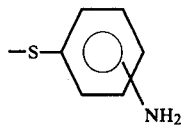

groups at the end have been described in French Patent Application No. 75.26056 of 22nd August 1975.

Although these latices have certain advantages, namely mechanical stability, stability during storage and simplicity of preparation as compared with known products, they do have the disadvantage of not having great stability relative to electrolytes. Furthermore, a large proportion of the

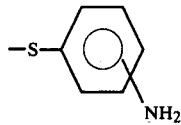

groups is occluded in the polymer particles and consequently not able to react subsequently.

Moreover it is known that the stability of polystyrene latices in electrolytes can be improved by the presence of carboxylic or sulphonate groups on the surface of the polymer particles. However, when the styrene is polymerised in aqueous emulsion, both in the presence of co-polymerisable monomers with either carboxylic groups or sulphonate groups and in the presence of a chain transfer agent with amino groups, there is no appreciable improvement in stability in electrolytes.

The products of the invention do not have these drawbacks. They are mechanically stable, stable during storage and stable in electrolytes, and their method of preparation makes it possible to obtain stabilising groups and

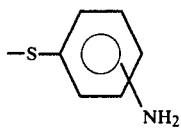

groups at the surface of the particles.

The latices according to the invention are dispersions of particles of vinyl polymers with

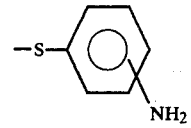

groups at the ends. They are characterised in that the particles are made up of a core of vinyl and/or diene polymer carrying carboxylic and/or sulphonate groups, and a peripheral layer of vinyl polymer with

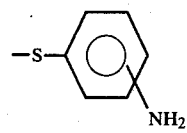

groups at the ends, and that the particles have an average diameter ranging from 0.03 to 5 μm.

The vinyl polymers forming the core of the particles refer to homo polymers of monomers represented by styrene and its derivatives; methylstyrenes, ethylstyrenes, vinyltoluene; vinyl chloride; vinylidene chloride; vinyl acetate; acrylic derivatives such as alkyl acrylates and methacrylates (1 to 10 C) which may possibly be hydroxylated, such as acrylates and methylacrylates of 2-hydroxy-ethyl and 2-hydroxy-propyl; acrylo and methacrylo nitriles; and copolymers of these monomers with one another and/or with modifying vinyl co-monomers represented by divinylbenzene, acrylic and methacrylic amides and their N-substituted derivatives, e.g. methylolacrylamide; these co-monomers constituting up to 5% by weight of the copolymer.

The diene polymers forming the core refer to homopolymers of butadiene and of its derivatives: chloroprene, isoprene and copolymers of these monomers with one another and/or with the above-mentioned vinyl monomers in any proportions, and/or with the above-mentioned modifying vinyl co-monomers, the proportion of these in the co-polymer being up to 5% by weight.

The vinyl polymers forming the peripheral layer of the particles are homo-polymers of monomers such as styrene and its derivatives, e.g. methylstyrenes, ethylstyrenes and vinyltoluene; hydroxylated or nonhydroxylated alkyl acrylates and methacrylates (1 to 10 C); acrylo and methacrylo nitriles; and co-polymers of these monomers with one another and/or with modifying vinyl co-monomers such as divinylbenzene or acrylic and methacrylic amides and their N-substituted derivatives, e.g. methylolacrylamide; these may constitute up to 5% by weight of the co-polymer.

In the particles the core polymer represents 30 to 99.5% and preferably 60 to 99% by weight and the polymer in the peripheral layer 70 to 0.5% and preferably 40 to 1% by weight.

The polymer particles may have a wide or narrow range of sizes, depending on the properties required and the applications envisaged for the latex. Their average diameter is from 0.03 to 5 μm and preferably from 0.05 to 1 μm. They represent up to 60% and preferably up to 45% by weight of the latex. However, there is no disadvantage in making the latex dilute or concentrated.

In the method of the invention the core polymer is prepared by polymerising the vinyl and/or diene monomers in emulsion, in the presence of at least one mono or polycarboxylic ethylene acid which can be co-polymerised with the monomer or monomers and/or in the presence of at least one co-polymerisable unsaturated alkaline organo sulphonate; then the polymer for the peripheral layer is prepared by polymerising the vinyl monomer or monomers in emulsion, in the presence of the previously obtained core polymer latex and in the presence of a chain transfer agent.

The monomers used in the polymerisation of the core polymer and that of the polymer for the peripheral layer are those listed above. Either all the monomers are employed before polymerisation; or part is used before polymerisation and the rest added to the reaction medium during polymerisation, in successive fractions or continuously; or all the monomers are used during polymerisation, in successive fractions or continuously.

Some examples of the co-polymerisable mono or polycarboxylic ethylene acids are acrylic, methacrylic, maleic, fumaric, crotonic, sorbic, cinnamic, itaconic, and aconitic acid, used in proportions ranging from 0.5 to 15% by weight and preferably from 0.5 to 10% by weight relative to the monomer or monomers.

The co-polymerisable unsaturated alkaline organo-sulphonates are represented by sodium vinyl sulphonate, sodium methallylsulphonate, sodium 2-acryloyloxy or sodium 2-methacryloyloxy ethane sulphonate and sodium 2-acrylamido, 2-methylpropane sulphonate. These are used in proportions ranging from 0.1 to 3% by weight relative to the monomer or monomers.

The co-polymerisable mono or polycarboxylic ethylene acids and the co-polymerisable unsaturated alkaline organosulphonates may be used either alone or in combination, in the proportions given.

The core polymer is prepared in emulsion, by any conventional process, in the presence of an initiator and an emulsifying agent.

The initiator used preferably consists of alkaline persulphates, water soluble diazo derivatives or redox systems based on hydrogen peroxide, organic peroxides or hydroperoxides, in proportions of approximately 0.01 to 5% and preferably 0.03 to 3% by weight of the monomer or monomers.

The emulsifying agent used may be anionic and/or non ionic. Such emulsifiers are conventional products of polymerisation in emulsion.

The anionic emulsifying agents include salts of fatty acids; alkaline alkyl sulphates, alkyl sulphonates, alkylaryl sulphonates, alkyl sulphosuccinates, and alkylphosphates; alkylsulphosuccinates; sulphonates of alkyl-phenolpolyglycolic ethers; salts of esters of alkylsulph-polycarboxylic acids; condensation products of fatty acids with oxy and amino alkane sulphonic acids; sulphated derivatives of polyglycolic ethers; sulphated esters of fatty acids and polyglycols; and alkanolamides of sulphated fatty acids.

The non ionic emulsifiers include fatty esters of poly alcohols, alkanolamides of fatty acids, polyoxides of ethylene, co-polyoxides of ethylene and propylene and oxyethylenated alkyl phenols.

The quantities of emulsifying agent or agents to be employed are approximately 0.01 to 5% by weight relative to the monomer or monomers. Either all the emulsifier is introduced before polymerisation; or part is introduced before polymerisation and the rest added to the reaction medium during polymerisation, in successive fractions or continuously; or all the emulsifier is added during polymerisation, in successive fractions or continuously.

The quantity of water to be used in polymerising the core polymer must be such that the concentration of the monomer or monomers does not exceed 60% by weight.

Although not essential, it is possible to add to the reaction medium any compound capable of modifying the ionic force of the medium and consequently the particle size, for example mineral salts or electrolytes, in quantities of up to 3% by weight relative to the monomers; or any compound capable of modifying the pH of the medium, for example buffers, acids or bases. In some cases, however, it has been found preferable for the medium to be neutral or acid in order to encourage polymerisation.

The polymerisation temperature, which is a function of the initiator used and the polymer to be obtained, is generally from $-5°$ to $90°$ C.

The latices obtained have polymer particles ranging in diameter from 0.03 to 5 $\mu$m and preferably from 0.05 to 1 $\mu$m. The particles are generally not calibrated, although it is possible to obtain calibrated ones by applying known calibrating processes for polymerisation in emulsion, such as the controlled addition of emulsifier and/or monomer(s) and more particularly seeding. In the latter case the emulsifier may be contained in the seeds.

The particles are made up of homo or co-polymer with carboxylic and/or sulphonate groups at the surface. The presence of these groups may be confirmed by conductimetric titration.

The polymer for the peripheral layer is prepared in aqueous emulsion, in the presence of the core polymer, a chain transfer agent, an initiator and possibly an emulsifier.

The quantity of core polymer used is from 30 to 99.5% and preferably from 60 to 99% by weight of the sum of core polymer plus monomer(s) to be polymerised.

The chain transfer agent of the aminophenyl disulphide or aminophenylmercaptan type is represented particularly by o,o'-dithiobisaniline, p,p'-dithiobisanaline, 2-mercapto-aniline, 3-mercapto-aniline and 4-mercapto-aniline. The agent is generally used dissolved in the monomer or monomers in proportions ranging from 0.1 to 10% and preferably from 0.5 to 5% by weight of the monomer or monomers.

The initiators required to polymerise the monomer or monomers in the peripheral layer are diazo initiators such as azonitriles, particularly azobis-isobutyronitrile, sulphonated azonitriles as described in French Patent No. 1.233.582, among which the following should be mentioned: azobis (isobutyronitrile sodium sulphonate), azobis ($\alpha$-methylbutyronitrile sodium sulphonate), azobis ($\alpha$methyl $\beta$-ethoxycarbonyl-butyronitrile sodium sulphonate); carboxylated azonitriles such as 4,4'-azobis (4-cyanopentanoic) acid and its salts; and salts of azobis-alkylamidinium, such as $\alpha,\alpha'$-azobis-isobutyramidinium chloride or azobis N,N'-dimethylene isobutyramidinium chloride.

The initiator is employed in quantities of 0.01 to 3% and preferably 0.1 to 2% by weight relative to the monomer or monomers. Either it is all used before polymerisation, or part is used before polymerisation and the rest added to the reaction medium during polymerisation, in successive fractions or continuously, particularly when the initiator has a short life at polymerisation temperature. The initiator may equally all be added continuously to the reaction medium during polymerisation.

The emulsifying agent, when present, is selected from the anionic and/or non ionic emulsifying agents recommended for preparing the core polymer; it may be identical with or different from that used for preparing the latter. The quantities used may be up to 10% by weight relative to the monomer or monomers. The method of introducing the emulsifier depends on the average diameter of the particles of latex to be obtained. Either all the emulsifier may be added before polymerisation, or part before polymerisation, the rest being added to the reaction medium during polymerisation, in successive fractions or continuously, or all the emulsifier may be added during polymerisation, in successive fractions or continuously.

The quantity of water to be used in polymerising the peripheral layer must be such that the concentration of core polymer plus monomer(s) to be polymerised does not exceed 60% and preferably does not exceed 45% by weight.

The polymerisation temperature, which is a function of the initiator chosen, is generally from 5° to 100° C. and preferably from 40° to 90° C.

The latices obtained have polymer particles ranging in diameter from 0.03 to 5 μm and preferably from 0.05 to 1 μm. Since there is only a small quantity of the peripheral layer it does not substantially affect the size of the particles of core polymer. The particles may or may not be calibrated. In some applications, however, for reasons of reproducibility, it is preferable for them to be calibrated, ie. to have a narrow distribution of particle sizes.

These latices are mechanically stable, stable during storage and stable in electrolytes, that is to say, they do not flocculate when mineral salts such as chlorides, nitrates, borates or phosphates of sodium, calcium, magnesium or potassium are added to them.

The particles are made up of polymers and have carboxylic and/or sulphonate groups and

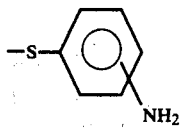

groups at the surface.

Although the peripheral layer is polymerised on the core polymer, the carboxylic and/or sulphonate groups remain accessible, as can be demonstrated by conductimetric titration, and the

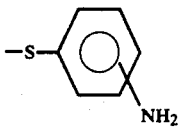

groups are available for subsequent reactions.

The latices according to the invention may be used for revealing diazonium salts in reproduction and as binders in the paint and varnish, glue and paper industries and in the textile industries (non-woven fabrics, sol coatings).

When the latices are used as binders, the presence of the

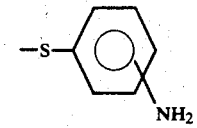

groups at the surface of the particles increases the adhesive forces of the polymer to the pigments in the case of paints and paper, to the fibres in the case of textiles, and to various carriers such as wood, metals and cement.

They may be applied to fixing proteins on particles of polymer, particularly by covalent chemical bonds; the latices of polymer-protein complexes obtained may then be used for purifying other proteins.

Some examples of the invention follow; these are given to illustrate the invention and do not impose any restrictions on it.

EXAMPLE 1

A core polymer latex is prepared in a 6 liter autoclave, using the following materials:

2,000 g deionised water
14 g potassium persulphate
14 g sodium pyrophosphate
14 g sodium methallylsulphonate
1.4 g sodium lauryl sulphate
28 g acrylic acid
28 g fumaric acid
1,400 g styrene.

Polymerisation is carried out at 75° C. in a nitrogen atmosphere. The monomer is introduced continuously over 7 hours, after which the reaction is continued for another 8 hours.

After cooling, a latex is obtained with a pH of 3 and a concentration of polymer particles of 42.2% by weight.

Electron microscopy shows the calibrated particles to have an average diameter (by number) of 0.19 μm.

Conductimetric titration shows that there are carboxylic and sulphonate groups at the surface of the polymer particles.

491 g of the latex obtained is placed in a 4 liter reactor with 1,457 g of water.

The mixture is agitated and heated to 70° C. This temperature is maintained throughout the reaction.

As soon as the mixture reaches 70° C. it is kept in a nitrogen atmosphere and the following are added simultaneously, in a constant flow, over 3 hours:

1.25 g of sodium dihexylsulphosuccinate in 150 g of water
0.20 g of α,α'-azobis-isobutyramidinium chloride in 210 g of water
18 g of styrene containing 0.45 g of p,p'-dithiobisaniline.

Polymerisation is continued for five hours, after which the mixture is cooled.

The latex obtained has a pH of 3.2 and a particle concentration of 9.6% by weight.

The non-polymerised monomer is carried away in steam.

Electron microscopy shows that no new particle has formed during polymerisation, and that the average diameter of the particles (by number) is 0.195 μm. 90% of the particles have a diameter between 0.185 and 0.205 μm.

The polystyrene particles have at the surface carboxylic and sulphonate groups, which are confirmed by conductimetric titration, and

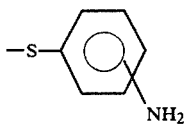

groups.

The stability of the latex obtained in electrolytes is determined as follows: 5 ml of latex is taken, with a particle concentration of 5% by weight; a 26.7 g/l aqueous solution of calcium nitrate is added drop by drop until either aggregates of particles or a flocculate appears.

The results are as follows:

less than 0.5 ml of calcium nitrate solution—0
0.5 to less than 5 ml—1
From 5 to less than 10 ml—2
From 10 to less than 20 ml—3
From 20 to less than 30 ml—4
Over 30 ml—5.

The stability of the latex obtained is 5.

EXAMPLE 2

The procedure for polymerising the core polymer is that of Example 1, in a 25 liter autoclave, with the following constituents and results:

4,800 g deionised water
50 g potassium persulphate
50 g sodium pyrophosphate
10 g sodium laurylsulphate
50 g sodium methallylsulphonate
200 g acrylic acid
4,000 g styrene
1,000 g of butadiene Characteristics of latex for core polymer:

pH 2.5
Concentration of polymer particles 51.5% by weight.

Electron microscopy shows the particles to have a diameter ranging from 0.19 to 0.22 μm; and 90% of them to have a diameter ranging from 0.2 to 0.21 μm.

The composition of the polymer is substantially that of the monomers used. The particles have carboxylic and sulphonate groups at the surface, ascertained by conductimetric titration.

402 g of the latex obtained and 1545 g of deionised water are placed in a 4 liter reactor, and the peripheral layer is formed as in Example 1.

Properties of the latex obtained;

pH—3.1
concentration of polymer particles—9.4% by weight
stability in electrolytes—5
average diameter (by number) of the particles—0.21 μm, 90% having a diameter from 0.205 to 0.215 μm.

The particles have at the surface carboxylic and sulphonate groups which are confirmed by conductimetric titration, and

groups.

EXAMPLE 3

The method of example 2 is followed, using:

1,537 g water
420 g of the same core polymer latex as in Example 2
0.62 g of sodium dihexysulphosuccinate in 150 g of water
0.10 g of α,α'-azobis-isobutyramidinium chloride in 210 g of water
9 g of styrene
0.225 g of p,p'-dithiobisaniline.

Properties of the latex obtained:

pH—2.9
concentration of polymer particles—9.5% by weight
stability in electrolytes—5
average diameter (by number) of the calibrated particles—0.207 μm The particles have at the surface carboxylic and sulphonate groups, as demonstrated by conductimetric titration, and

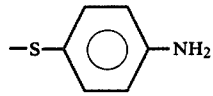

groups.

EXAMPLE 4

Example 2 is repeated with the following constituents for the preparation of the core polymer:

6,059 g deionised water
50 g potassium persulphate
50 g sodium pyrophosphate
2,427 g of the core polymer latex with 51.5% by weight from Example 2
50 g sodium methallylsulphonate
175 g acrylic acid
25 g fumaric acid
4,000 g styrene
1,000 g butadiene Properties of the core polymer latex:

pH—2.5
concentration of polymer particles—5.6% by weight
average diameter (by number)—0.340 μm.

The composition of the polymer is substantially that of the monomers used. The particles have carboxylic and sulphonate groups at the surface.

401 g of the latex obtained and 1,546 g of deionised water are used for polymerising the peripheral layer, as in Example 1.

Properties of the latex obtained:

pH—3
concentration of polymer particles—9.4% by weight
stability in electrolytes—5
average diameter (by number) of the particles —0.35 μm, 90% having a diameter from 0.345 to 0.355 μm.

The particles have carboxylic and sulphonate groups and

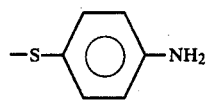

groups at the surface.

EXAMPLE 5

The procedure of Example 2 is followed with the following constituents, for the preparation of the core polymer latex:

7,760 g deionised water
80 g potassium persulphate
80 g sodium pyrophosphate
80 g sodium methallylsulphonate
40 g sodium laurylsulphate
160 g acrylic acid
160 g fumaric acid
320 g methacrylic acid
4,400 g styrene
2,960 g butadiene Properties of the core polymer latex:

pH 2.5
concentration of polymer 51% by weight
average diameter (by number) of the calibrated particles 0.140 μm.

The polymer has the composition of the monomers used, and the particles have carboxylic and sulphonate groups at the surface.

The peripheral layer is polymerised as in Example 2, with 406 g of the latex obtained and 1,541 g of water.

Properties of latex obtained:

pH—3.1
concentration of polymer particles—9.5% by weight
stability in electrolytes—5
average diameter (by number) of particles 0.145 μm; 90% having a diameter from 0.140 to 0.150 μm.

The particles have carboxylic and sulphonate groups and

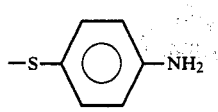

groups at the surface.

EXAMPLE 6

The following are placed in a 6 liter reactor:

4,482 g deionised water
7 g potassium persulphate
48 g acrylic acid
436 g styrene The mixture is agitated, heated to 70° C. and kept at that temperature in a stream of nitrogen for 15 hours. After 4 hours' polymerisation a solution of 0.3 g sodium dihexylsulphosuccinate in 150 g water is introduced continuously over 5 hours.

After cooling, a latex is obtained which has the following properties:

pH—3
concentration of polymer particles—9.3% by weight
average diameter (by number) of
calibrated particles—0.300 μm.

The particles of styrene polymer obtained have carboxylic groups at the surface.

The latex is brought to a concentration of 15% in a rotary evaporator.

1,380 g of the latex obtained is placed in a reactor with 587 g of water, and the peripheral layer is formed as in Example 1.

The latex obtained has the following properties:

pH—3.2
concentration of polymer particles—9.6% by weight
stability in electrolytes—3
average diameter (by number) of the particles —0.305 μm, 90% of the particles having a diameter from 0.30 to 0.31 μm.

The particles have carboxylic groups and

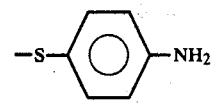

groups at the surface.

A polystyrene core latex not containing any carboxylic groups is prepared by way of comparison.

The following are placed in a 2 liter reactor:

607 g deionised water
4.5 g potassium persulphate
436 g styrene
3.5 g sodium dihexylsulphosuccinate The mixture is agitated, heated to 70° C. and kept at that temperature in a stream of nitrogen for 15 hours. After 1 hours polymerisation a solution of 2.5 g potassium persulphate dissolved in 100 g water is introduced continuously over 7 hours.

After cooling, the latex obtained has the following properties:

pH—2.5
concentration of polymer particles—40.5% by weight
average diameter (by number) of calibrated particles 0.30 μm no carboxylic groups at the surface 511 g of the core polymer latex obtained are placed in a reactor with 1,436 g of water, to obtain the same concentration as in Example 6, and the peripheral layer is formed as in Example 6.

The latex obtained has the following properties:

pH—3.3
concentration of polymer particles—9.4% by weight
stability in electrolytes—0
average diameter (by number of particles) 0.305 μm.

The difference in stability in electrolytes when the particles do not have any stabilising groups will be noted.

EXAMPLE 7

The following are placed in a 6 liter reactor:

4,000 g deionised water
12 g potassium persulphate
4.25 g sodium vinylsulphonate
6 g sodium dihexylsulphosuccinate
605 g styrene The mixture is agitated, heated to 70° C. and kept at that temperature in a stream of nitrogen for 15 hours.

Properties of the latex obtained are:

pH—2
concentration of polymer particles—13.4% by weight
average diameter (by number) of calibrated particles —0.22 μm The particles of the styrene polymer obtained have sulphonate groups at the surface.

The peripheral layer is polymerised in the same way as in Example 1, with 1,545 g of the core polymer latex obtained and 400 g of deionised water.

The latex obtained has the following properties:

pH—2.3
concentration of polymer particles—9.5% by weight
stability in electrolytes—1
average diameter (by number) of particles—0.225 μm;
90% of the particles having a diameter from 0.21 to 0.24 μm.

The particles have sulphonate groups and

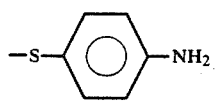

groups at the surface.

EXAMPLE 8

Example 1 is repeated, using 18 g of methyl methacrylate instead of 18 g of styrene for preparing the peripheral layer.

Properties of the latex obtained:

pH—3.15
concentration of polymer particles—9.4% by weight
stability in electrolytes—5
average diameter (by number) of particles—0.195 μm, 90% having a diameter from 0.185 to 0.205 μm.

The particles have carboxylic and sulphonate groups and

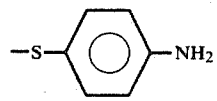

groups at the surface.

EXAMPLE 9

A core polymer latex is prepared in a 4 liter autoclave, using the following materials:

1,173 g of deionised water
9.5 g sodium dodecylbenzene sulphonate
7 g ammonium persulphate
5 g sodium bicarbonate
24 g crotonic acid
1,180 g vinyl acetate Polymerization is carried out at 80° C. in a nitrogen atmosphere, the monomer being introduced continuously over 5 hours, after which the reaction is continued for a further hour.

After cooling, a latex is obtained with the following properties:

pH—3.6
concentration of polymer particles—52.1% by weight
the latex is poly dispersed, the diameter of the particles varying from 0.05 to 0.30 μm.

The polymer particles have carboxylic groups at the surface, as demonstrated by conductimetric titration.

The peripheral layer is polymerised as in Example 1, but with 397 g of the core polymer latex obtained and 1,550 g of deionised water.

Properties of the latex obtained:

pH—3.6
concentration of polymer particles—9.4% by weight
stability in electrolytes—5
diameter of particles ranging from—0.05 to 0.30 μm.

The particles have carboxylic groups and

groups at the surface.

EXAMPLE 10

A core polymer latex is prepared in a 4 liter reactor, using the following materials:
3,000 g deionised water
0.25 g alkyl (average 15 C) sodium sulphonate
2.5 g sodium methallylsulphonate
2.5 g ammonium persulphate
2.5 g acrylamide
20 g acrylic acid
500 g methyl methacrylate Polymerisation is carried out at 80° C. in a nitrogen atmosphere the mixture of monomers being introduced continuously over 5 hours, after which the reaction is continued for a further three hours.

After cooling, a latex is obtained with a pH of 3 and a concentration of polymer particles of 14.5% by weight.

All the particles of the latex have a diameter ranging from 0.23 to 0.25 μm.

The polymer has the composition of the monomers used, and the particles have carboxylic and sulphonate groups at the surface.

The peripheral layer is polymerised as in Example 1, but with 1,428 g of the core polymer latex obtained and 520 g of deionised water.

Properties of the latex obtained:

pH—3.1
concentration of polymer particles—9.6% by weight
stability in electrolytes—3
average diameter (by number) of the particles—0.245 μm, 90% of the particles having a diameter from 0.240 to 0.250 μm.

The particles have carboxylic and sulphonate groups and

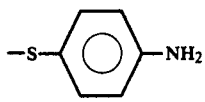

groups at the surface.

EXAMPLE 11

Example 8 is repeated, using 1 428 g of the same core polymer latex as in Example 10 and 520 g of deionised water for polymerising the peripheral polymer.

Properties of the latex obtained:

pH—3.1
concentration of polymer particles      9.7% by weight
stability in electrolytes—3
average diameter (by number) of particles—0.245 μm, 90% of the particles having a diameter from 0.240 to 0.250 μm.

The particles have carboxylic and sulphonate groups and

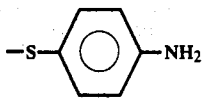

groups at the surface.

EXAMPLE 12

The peripheral layer is polymerised as follows, with the same core polymer latex as in Example 2.

The following are placed in a 4 liter reactor:

2 007 g deionised water
315 g of the core polymer latex from Example 2.

The mixture is heated to 70° C. then kept agitated at that temperature in a nitrogen atmosphere.

As soon as it reaches 70° C., the following are introduced simultaneously in a constant flow over 5 hours:
7.5 g sodium dihexylsulphosuccinate in 150 g water
1.2 g α,α'-azobis-isobutyramidinium chloride in 210 g water
108 g styrene containing 2.7 g p,p'-dithiobisaniline.

Polymerisation is continued for 5 hours then the reaction medium is cooled.

Properties of the latex obtained:

pH—3.8
concentration of polymer particles—8% by weight
stability in electrolytes—1
average diameter (by number) of particles—0.235 μm, 90% of the particles having a diameter from 0.230 to 0.240 μm.

The particles have carboxylic and sulphonate groups and

groups at the surface.

EXAMPLE 13

The method is the same as in Example 12, except that the 2,007 g of deionised water and 315 g of core polymer latex from Example 2 are replaced by 2,436 g of the core polymer latex from Example 5.

Properties of the latex obtained:

pH—3.1
concentration of polymer particles—38% by weight
stability in electrolytes—5
average diameter (by number) of the particles—0.145 μm, 90% having a diameter ranging from 0.140 μm to 0.150 μm.

The particles have carboxylic and sulphonate groups and

groups at the surface.

EXAMPLE 14

A core polymer latex is prepared in a 25 liter autoclave, using the following materials:
4,800 g deionised water
50 g potassium persulphate
50 g sodium pyrophosphate
10 g sodium laurylsulphate
50 g sodium methallylsulphonate
100 g acrylic acid
100 g itaconic acid
2,135 g styrene
2,865 g butadiene Polymerisation is carried out at 75° C. in a nitrogen atmosphere. The monomers are introduced continuously over 7 hours and the reaction is continued for a further 8 hours thereafter.

After cooling, a latex is obtained with a pH of 2.5 and a concentration of polymer particles of 51% by weight.

Electron microscopy shows the particles to have an average diameter (by number) of 0.145 μm, and 90% of them to have a diameter ranging from 0.14 to 0.15 μm.

The composition of the polymer is substantially that of the monomers used. The particles have carboxylic and sulphonate groups at the surface, revealed by conductimetric titration.

406 g of the latex obtained and 1,541 g of deionised water are placed in a reactor. The mixture is agitated, heated to 70° C. and kept at that temperature throughout the reaction.

As soon as the mixture reaches 70° C. it is kept in a nitrogen atmosphere, and the following materials are added to it simultaneously in a constant flow, over 3 hours:

1.25 g sodium dihexylsulphosuccinate in 150 g water
0.20 g α,α'-azobis-isobutyramidiniun chloride in 210 g water
18 g styrene containing 0.45 g p,p'-dithiobisaniline.

Polymerisation is then continued for 5 hours, after which the mixture is cooled.

Properties of the latex obtained:

pH—3.1
concentration of polymer particles—9.3% by weight
stability in electrolytes—5
average diameter (by number) of particles—0.15 μm, 90% of the particles having a diameter from 0.145 to 0.155 μm.

The particles have at the surface carboxylic and sulphonate groups, confirmed by conductimetric titration, and

groups.

APPLICATION OF THE LATEX FROM EXAMPLE 14 IN COATING PAPER

An aqueous coating composition is prepared with:

kaolin—100 parts by weight
sodium hexametaphosphate—0.3 part
latex—12 parts of dry polymer.

The dry material content of the composition obtained is 48% by weight, and its pH is adjusted to 8 by adding ammonia.

A layer of 15 g/m² of the composition, expressed in dry material, is applied to a 54 g/m² paper, using a drying press with a sheet of air. The paper is dried in a tunnel furnace at 120° C., then undergoes calendering comprising 4 successive passes between 2 cylinders at a force of 150 kg/cm.

As a comparison, a coated paper is prepared in the same way, with 12 parts (by weight of dry polymer) of the core polymer latex instead of the above latex.

After being dried and calendered the coated paper is conditioned at 20° C. in an atmosphere with 65% relative humidity, then tested for dry and wet strength using the following methods:

Resistance to dry tearing: This is determined by means of the IGT apparatus designed by the "Institut von Grafischer Technik", in which the paper is put into contact with an inking roller. The pressure of the roller onto the paper is set to a chosen value, and its speed is increased until the coated layer is found to be beginning to tear. Resistance to dry tearing is determined by the value of the speed corresponding to the beginning of tearing. The ink used is the graduated draft ink "3803" sold by Etablissements LORILLEUX LEFRANC.

Resistance to moist tearing: This is again determined by means of the IGT apparatus, but inking is effected with a sample of coated paper on which a thin film of water has previously been deposited. Resistance to moist tearing is determined visually by comparison with other samples. The ink used is "3803" marketed by Establissements LORILLEUX LEFRANC. The results are expressed by a mark ranging from 0 to 10, mark 0 corresponding to a paper with very poor resistance and mark 10 to a paper with excellent resistance.

The results obtained are as follows:

|  | Latex in Example 14 | Latex of Core Polymer |
| --- | --- | --- |
| Resistance to dry tearing (cm/s) | 53 | 51 |
| Resistance to moist tearing (mark) | 8 | 5 |

We claim:

1. Latices of vinyl polymers comprising dispersions of particles of vinyl polymers with terminal

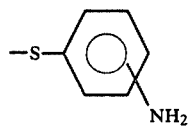

groups, in which the particles are made up of a core of vinyl and/or diene polymer carrying carboxylic and/or sulphonate groups, in which the vinyl polymer is a homopolymer of styrene or a derivative of styrene, vinyl chloride, vinylidene chloride, vinyl acetate or an acrylic derivative, or a copolymer of one or more such monomers with one another and/or with a modifying vinyl comonomer constituting up to 5% by weight of the copolymer, and a peripheral layer of vinyl polymer with terminal

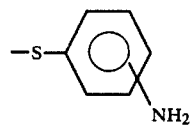

groups, in which the vinyl polymer is a homopolymer of styrene or a styrene derivative, a $C_{1-10}$ alkyl acrylate or methacrylate, acrylonitrile or methacrylonitrile, or a copolymer of one or more such monomers with one another and/or with a modifying vinyl comonomer constituting up to 5% by weight of the copolymer, and have an average diameter from 0.03 to 5 μm.

2. Latices as claimed in claim 1, in which the diene polymer is a homopolymer of butadiene or a derivative of butadiene or a copolymer of one or more such monomers with one another and/or with a vinyl monomer as defined in claim 1 and/or a modifying vinyl comonomer constituting up to 5% by weight of the copolymer.

3. Latices as claimed in claims 1 or 2, in which the modifying vinyl comonomer is divinylbenzene, an acryl- or methacryl amide or an N-substituted derivative thereof.

4. Latices as claimed in claim 1, in which the core polymer constitutes 30 to 99.5% by weight and the polymer of the peripheral layer constitutes 70 to 0.5% by weight of the particle.

5. A method of preparing latices as claimed in claim 1, comprising polymerizing vinyl and/or diene monomer(s) as defined in claims 1 and 2 in emulsion, in the presence of at least one copolymerizable monocarboxylic or polycarboxylic ethylenically unsaturated acid in an amount in the range from 0.5 to 15% by weight relative to the monomer(s) and/or at least one copolymerizable unsaturated alkali metal organo-sulphonate in an amount in the range from 0.1 to 3% by weight relative to the monomer(s), to produce the core polymer and then polymerizing the vinyl monomer(s) as defined in claim 17 in the presence of the core polymer in an amount in the range from 30 to 99.5% by weight of the sum of the weight of the core polymer and monomer(s) to be polymerized, and a chain transfer agent in an amount in the range from 0.1 to 10% by weight of the monomer(s) to produce the peripheral layer.

6. A method as claimed in claim 5, in which the copolymerizable ethylenically unsaturated acid is acrylic, methacrylic, maleic, fumaric, crotonic, sorbic, cinnamic, itaconic, or aconitic acid.

7. A method as claimed in claim 5, in which the copolymerizable unsaturated alkali metal organosulphonate is sodium vinylsulphonate, sodium metallylsulphonate, sodium 2-acryloyloxyethanesulphonate, sodium 2-methacryloyloxyethanesulphonate or sodium 2-acrylamido-2-methylpropanesulphonate.

8. A method as claimed in claim 5, in which in the preparation of the core polymer, the concentration of monomer or monomers does not exceed 60% by weight.

9. A method as claimed in claim 5, in which the polymerization temperature is from 5° to 90° C. in the preparation of the core polymer.

10. A method as claimed in claim 5, in which the chain transfer agent is an amino phenyl disulphide or an amino phenyl mercaptan.

11. A method as claimed in claim 5, in which, in the preparation of the polymer of the peripheral layer, a diazo initiator such as an azonitrile, a sulphonated or carboxylated azonitrile, or an azobis-alkylamidinium salt is used in an amount in the range from 0.01 to 3% by weight relative to the monomer or monomers.

12. A method as claimed in claim 5, in which, in the preparation of the polymer or the peripheral layer, the concentration of core polymer plus monomer or monomers to be polymerized does not exceed 60% by weight.

13. A method as claimed in claim 5, in which the polymerization temperature is from 5° to 100° C. in the preparation of the polymer of the peripheral layer.

* * * * *